(12) United States Patent
Kato

(10) Patent No.: US 10,360,492 B2
(45) Date of Patent: *Jul. 23, 2019

(54) CARRIER TAPE, METHOD FOR MANUFACTURING SAME, AND METHOD FOR MANUFACTURING RFID TAG

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,393

(22) Filed: Sep. 7, 2018

(65) Prior Publication Data

US 2019/0019071 A1    Jan. 17, 2019

Related U.S. Application Data

(63) Continuation of application No. PCT/JP2017/011427, filed on Mar. 22, 2017.

(30) Foreign Application Priority Data

Apr. 11, 2016    (JP) ................. 2016-079046

(51) Int. Cl.
*B65B 15/04*  (2006.01)
*B65D 73/02*  (2006.01)
*G06K 19/077*  (2006.01)

(52) U.S. Cl.
CPC ............ *G06K 19/077* (2013.01); *B65B 15/04* (2013.01); *G06K 19/07718* (2013.01)

(58) Field of Classification Search
CPC ............ G06K 19/077; G06K 19/07718; B65B 15/04; B65D 73/02
See application file for complete search history.

(56) References Cited

U.S. PATENT DOCUMENTS 9,775,270 B2    9/2017  Kato et al.
2009/0166431 A1    7/2009  Aoyama
(Continued)

FOREIGN PATENT DOCUMENTS

JP    2008084149 A    4/2008
JP    2009129217 A    6/2009
(Continued)

OTHER PUBLICATIONS

International Search Report issued for PCT/JP2017/011427, dated May 26, 2017.

(Continued)

*Primary Examiner* — Sonji N Johnson
(74) *Attorney, Agent, or Firm* — Arent Fox LLP

(57) ABSTRACT

A method for manufacturing a carrier tape housing electronic components with seal materials includes preparing a tape-shaped main body including housing holes penetrating from one surface to other surface along a longitudinal direction, preparing a tape-shaped seal material including an adhesive layer on the one surface and including pairs of terminal electrodes on the adhesive layer, affixing the adhesive layer to the other surface such that respective portions of the paired terminal electrodes are located within each of the housing holes in a planar view, forming cuts in the tape-shaped seal material to separate portions defining and functioning as the seal materials including portions overlapping with the respective housing holes in a planar view from the other portions, and providing an electronic component into each housing hole and connecting the respective portions of the paired terminal electrodes located within each of the housing holes to the electronic component.

20 Claims, 11 Drawing Sheets

1

(56) References Cited

U.S. PATENT DOCUMENTS

2012/0074229 A1 3/2012 Osamura et al.
2016/0353619 A1 12/2016 Kato et al.
2017/0017872 A1 1/2017 Kato et al.

FOREIGN PATENT DOCUMENTS

| JP | 2010055467 A | 3/2010 |
| JP | 5904316 B1 | 4/2016 |
| JP | 6057042 B1 | 1/2017 |
| WO | 2006112447 A1 | 10/2006 |
| WO | 2010140429 A1 | 12/2010 |

OTHER PUBLICATIONS

Written Opinion of the International Searching Authority issued for PCT/JP2017/011427, dated May 26, 2017.

CARRIER TAPE, METHOD FOR MANUFACTURING SAME, AND METHOD FOR MANUFACTURING RFID TAG

CROSS REFERENCE TO RELATED APPLICATIONS

This is a continuation application of international Application No. PCT/JP2017/011427, with an international filing date of Mar. 22, 2017, which claims priority of Japanese Patent Application No. 2016-079046 filed on Apr. 11, 2016, the entire contents of each of the applications are incorporated herein by reference.

FIELD OF THE INVENTION

The present disclosure relates to a method for manufacturing an RFID (radio frequency identifier) tag as well as a carrier tape used for manufacturing the RFID tag and a method for manufacturing the same.

BACKGROUND

For an article information management system, an RFID system is recently put to practical use and the RFID system allows a reader/writer and an RFID tag applied to an article to communicate in a noncontact technique utilizing a magnetic field or an electromagnetic field so as to transmit predetermined information.

For such existing systems, the RFID tag is manufactured by attaching an RFIC element (an RFIC (radio frequency integrated circuit) chip itself or a package equipped with an RFIC chip) to an antenna base material provided with an antenna element. Conventionally known methods for connecting the RFIC element and the antenna element include a method described in JP No. 2008-84149 A, for example.

In JP No. 2008-84149 A, the RFIC element is connected to a pair of terminal electrodes (also referred to as connection conductors) formed on a base material. The base material is affixed to an antenna base material by a nonconductive adhesive such that the pair of terminal electrodes is connected to an antenna element on the antenna base material. As a result, the RFIC element and the antenna element are connected via the pair of terminal electrodes, and an RFID tag is manufactured.

Moreover, in JP No. 2008-84149 A, after a conductive foil such as a copper foil is formed on an entire surface of a sheet-like base material extending in a band shape, the conductive foil is patterned by etching, or the like, into a desired shape to form multiple pairs of terminal electrodes. Subsequently, RFIC elements are respectively connected to the pairs of terminal electrodes. At that point, the sheet-like base material is cut to obtain one RFIC element with base material connected to a pair of terminal electrodes. This RFIC element with base material is affixed to an antenna base material via an adhesive to manufacture an RFID.

This conventional manufacturing method has a problem since it is difficult to precisely connect an RFIC element that is a minute electronic component to a pair of terminal electrodes. Additionally, when the RFIC element with base material is affixed to the antenna base material with an adhesive, the adhesive is interposed between the pair of terminal electrodes and the antenna element. To avoid this interposition, when the adhesive is applied onto the substrate, the adhesive may be applied while avoiding the pair of terminal electrodes. However, in this case, it is difficult to accurately apply the adhesive, and an insufficient amount of the adhesive may reduce the reliability of connection between the antenna element and the pair of terminal electrodes.

SUMMARY OF THE INVENTION

In view of the foregoing, a carrier tape and a method for manufacturing the same is disclosed herein that enables more accurate connection of an electronic component to a pair of terminal electrodes. Another object of the present disclosure is to provide a method for manufacturing an RFID tag in which the reliability of connection can be improved between an antenna element and a pair of terminal electrodes by using the carrier tape.

A method for manufacturing a carrier tape according to an exemplary embodiment of the present disclosure includes manufacturing a carrier tape housing with a plurality of electronic components with seal materials, where the method includes preparing a tape-shaped main body including a plurality of housing holes penetrating from one principal surface to the other principal surface along a longitudinal direction; preparing a tape-shaped seal material including an adhesive layer on the one principal surface and including a plurality of pairs of terminal electrodes on the adhesive layer; and affixing the adhesive layer of the tape-shaped seal material to the other principal surface of the tape-shaped main body such that respective portions of the paired terminal electrodes are located within each of the housing holes in a planar view. In addition, the method further includes forming cuts in the tape-shaped seal material to separate portions defining and functioning as the seal materials (i.e., sealing members or seals) including portions overlapping with the respective housing holes in a planar view from the other portions; and providing a chip-shaped electronic component into each of the housing holes of the tape-shaped main body and connecting the respective portions of the paired terminal electrodes located within each of the housing holes to the electronic component.

Moreover, a carrier tape according to an exemplary embodiment of the present disclosure includes a carrier tape housing with a plurality of electronic components with seal materials. In this embodiment, the carrier tape includes a tape-shaped main body including a plurality of housing holes penetrating from one principal surface to the other principal surface along a longitudinal direction; a plurality of seal materials each including an adhesive layer on one principal surface and a pair of terminal electrodes on the adhesive layer and affixed to the other principal surface of the tape-shaped main body such that a portion of the adhesive layer and respective portions of the paired terminal electrodes are located within each of the housing holes in a planar view; and a plurality of chip-shaped electronic components housed in the respective housing holes and connected to the respective portions of the paired terminal electrodes located within the housing holes.

Yet further, a method for manufacturing an RFID tag according to an exemplary embodiment of the present disclosure is provided that includes the preparing a carrier tape housing a plurality of RFIC elements with seal materials, the carrier tape having a tape-shaped main body including a plurality of housing holes penetrating from one principal surface to the other principal surface along a longitudinal direction, a plurality of seal materials each including an adhesive layer on one principal surface and a pair of terminal electrodes on the adhesive layer and affixed to the other principal surface of the tape-shaped main body such that a portion of the adhesive layer and respective portions of the paired terminal electrodes are located within each of the housing holes in a planar view, and a plurality of RFIC elements housed in the respective housing holes and connected to the respective portions of the paired terminal electrodes located within the housing holes. Moreover, the method includes folding the tape-shaped main body to separate each of the RFIC elements with seal materials from the tape-shaped main body; and affixing the separated RFIC element with a seal material to an antenna base material by the adhesive layer of the seal material.

According to the exemplary carrier tape and the exemplary method for manufacturing the same, the electronic component can more accurately be connected to the pair of terminal electrodes as compared with convention designs.

According to the exemplary method for manufacturing an RFID tag, the reliability of connection can be improved between the antenna element and the pair of terminal electrodes as compared with conventional designs.

DETAILED DESCRIPTION OF THE PREFERRED EMBODIMENTS

Figure 1:
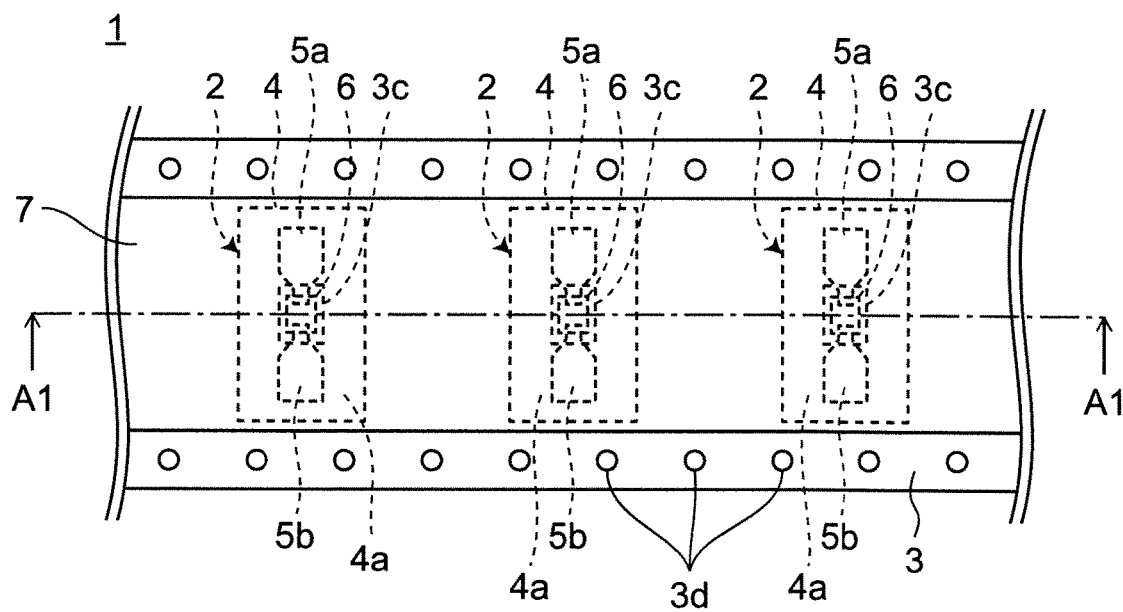
FIG. 1 is a plan view of a general configuration of a carrier tape according to an exemplary embodiment of the present disclosure.

A method for manufacturing a carrier tape according to an exemplary embodiment of the present disclosure is a method for manufacturing a carrier tape housing a plurality of electronic components with seal materials. In this aspect, the method includes preparing a tape-shaped main body including a plurality of housing holes penetrating from one principal surface to the other principal surface along a longitudinal direction; preparing a tape-shaped seal material including an adhesive layer on the one principal surface and including a plurality of pairs of terminal electrodes on the adhesive layer; affixing the adhesive layer of the tape-shaped seal material to the other principal surface of the tape-shaped main body such that respective portions of the paired terminal electrodes are located within each of the housing holes in a planar view; forming cuts in the tape-shaped seal material to separate portions defining and functioning as the seal materials including portions overlapping with the respective housing holes in a planar view from the other portions; and providing a chip-shaped electronic component into each of the housing holes of the tape-shaped main body and connecting the respective portions of the paired terminal electrodes located within each of the housing holes to the electronic component.

According to this exemplary method for manufacturing, since respective portions of the paired terminal electrodes are located within each of the housing holes, the electronic component can be housed into the housing hole by using the housing hole as a guide. Therefore, the electronic component can more accurately be positioned and connected to the pair of the terminal electrodes. For example, the electronic component precoated with solder is housed in the housing hole and then heated. Alternatively, solder is printed on respective portions of the paired terminal electrodes and heated after housing the electronic component in the housing hole. In these cases, the housing hole can act as a guide to improve the self-alignment effect of the solder, so that the electronic component can more accurately be connected to the pair of the terminal electrodes. Additionally, since a plurality of the electronic components with seal materials is housed in the carrier tape, the handleability of the plurality of the electronic components with seal materials is improved.

A method for manufacturing a carrier tape may further include a step of affixing a tape-shaped cover material to the one principal surface of the tape-shaped main body to cover the plurality of the housing holes housing the electronic components.

According to this method for manufacturing, dusts, and the like, are prevented from entering the housing holes housing the electronic components, and the electronic component are more accurately connected to the pair of the terminal electrodes.

A method for manufacturing a carrier tape may further include a step of separating the portions other than those defining and functioning as the seal materials from the tape-shaped main body after the cuts are formed in the tape-shaped seal material.

According to this method for manufacturing, when the electronic components with seal materials are separated from the tape-shaped main body, the electronic components with seal materials are separated after the portions other than those defining and functioning as the seal materials are removed, and therefore is easily removed.

A carrier tape according to an exemplary embodiment of the present disclosure is a carrier tape housing a plurality of electronic components with seal materials. In this aspect, the carrier tape includes a tape-shaped main body including a plurality of housing holes penetrating from one principal surface to the other principal surface along a longitudinal direction; a plurality of seal materials each including an adhesive layer on one principal surface and a pair of terminal electrodes on the adhesive layer and affixed to the other principal surface of the tape-shaped main body such that a portion of the adhesive layer and respective portions of the paired terminal electrodes are located within each of the housing holes in a planar view; and a plurality of chip-shaped electronic components housed in the respective housing holes, affixed to portions of the adhesive layers of the seal materials located in the respective housing holes, and connected to the respective portions of the paired terminal electrodes located within the housing holes.

According to this exemplary carrier tape, since respective portions of the paired terminal electrodes are located within each of the housing holes, the electronic component can be housed into the housing hole by using the housing hole as a guide. Therefore, the electronic component can more accurately be positioned and connected to the pair of the terminal electrodes. Additionally, since a plurality of the electronic components with seal materials or seal members is housed in the carrier tape, the handleability of the plurality of the electronic components with seal materials is improved.

The plurality of seals preferably include a rigidity that is higher than a rigidity of the tape-shaped main body. As a result, when the tape-shaped main body is folded, the separation of the seal materials from the tape-shaped main body is facilitated.

Moreover, the electronic components may be RFIC elements in one exemplary aspect.

A method for manufacturing an RFID tag according to an exemplary embodiment of the present disclosure includes preparing a carrier tape housing a plurality of RFIC elements with seal materials, the carrier tape including a tape-shaped main body including a plurality of housing holes penetrating from one principal surface to the other principal surface along a longitudinal direction, a plurality of seal materials each including an adhesive layer on one principle surface and a pair of terminal electrodes on the adhesive layer and affixed to the other principal surface of the tape-shaped main body such that a portion of the adhesive layer and respective portions of the paired terminal electrodes are located within each of the housing holes in a planar view, and a plurality of RFIC elements housed in the respective housing holes, affixed to portions of the adhesive layers of the seal materials located in the respective housing holes, and connected to the respective portions of the paired terminal electrodes located within the housing holes; folding the tape-shaped main body to separate each of the RFIC elements with seal materials from the tape-shaped main body; and affixing the separated RFIC element with a seal material to an antenna base material by the adhesive layer of the seal material.

According to this exemplary method for manufacturing, since respective portions of the paired terminal electrodes are located within each of the housing holes, the RFIC element can be housed into the housing hole by using the housing hole as a guide. Therefore, the RFIC element can more accurately be positioned and connected to the pair of the terminal electrodes. Since an adhesive is not applied onto the pair of the terminal electrodes, and the pair of the terminal electrodes is on the adhesive layer, the adhesive layer is not formed on the pair of the terminal electrodes, while the adhesive layer is formed on the portion other than the pair of the terminal electrodes. Therefore, it is not necessary to accuracy apply the adhesive layer, and an amount of the adhesive does not become insufficient, so that the reliability of the connection between the antenna element and the pair of the terminal electrodes can be improved. Moreover, since the RFIC elements with seal materials are separated from the tape-shaped main body by simply folding the tape-shaped main body, manufacturing steps are shortened and manufacturing costs are reduced.

The carrier tape may be wound around a supply reel, and while the carrier tape is continuously pulled out from the supply reel, the tape-shaped main body of the pulled-out carrier tape may be folded at a certain position away from the supply reel to sequentially separate the plurality of the RFIC elements with seal materials from the tape-shaped main body.

According to this exemplary method for manufacturing, the plurality of the RFIC elements are able to be separated from the tape-shaped main body at high speed. Consequently, a plurality of RFID tags is able to be manufactured in shorter time.

Preferably, the plurality of seals include a shape (e.g., a rectangular or substantially rectangular shape) including a longitudinal direction and a transverse direction in a planar view and, when each of the RFIC elements with seal materials is separated from the tape-shaped main body, a portion in the longitudinal direction of the seal material is first separated. As a result, the RFIC elements with seal materials are more easily be separated from the tape-shaped main body.

An exemplary embodiment of the present disclosure will now be described with reference to the drawings.

Figure 2:
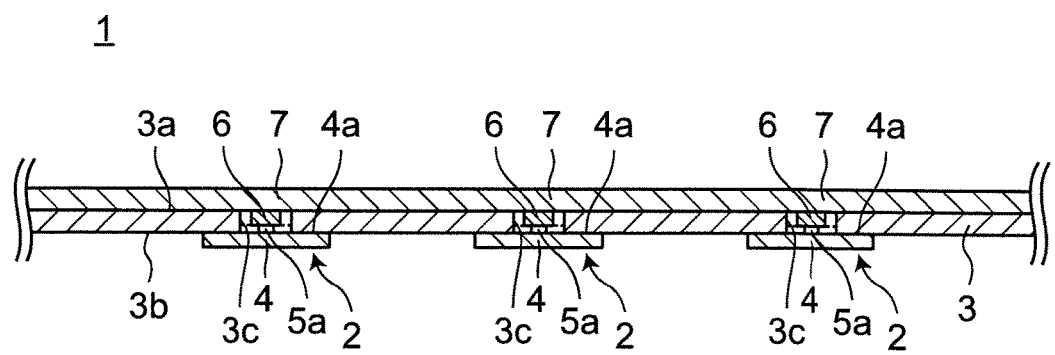
FIG. 2 is a cross-sectional view taken along a line A1-A1 of FIG. 1.
Figure 3:
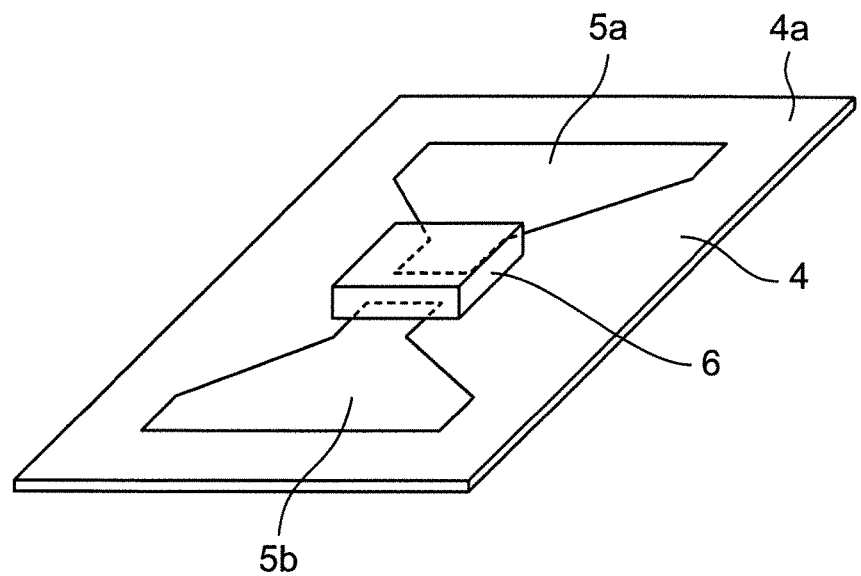
FIG. 3 is a perspective view of a general configuration of an electronic component with a seal material.

Specifically, FIG. 1 is a plan view of a general configuration of a carrier tape according to an exemplary embodiment of the present disclosure. FIG. 2 is a cross-sectional view taken along a line A1-A1 of FIG. 1. FIG. 3 is a perspective view of a general configuration of an electronic component with a seal material.

As shown in FIGS. 1 and 2, a carrier tape 1 according to the exemplary embodiment is configured to house a plurality of electronic components 2 with seal materials. More specifically, the carrier tape 1 includes a tape-shaped main body 3, a plurality of seal materials 4, pairs of terminal electrodes 5a, 5b, a plurality of chip-shaped electronic components 6, and a tape-shaped cover material 7. The electronic components 2 with seal materials include the seal materials 4, the pairs of terminal electrodes 5a, 5b and the electronic components 6.

The tape-shaped main body 3 includes one principal surface 3a (i.e., a first principal surface) and another principal surface 3b (i.e., a second principal surface that opposes the first principal surface). In an exemplary aspect, the one principal surface 3a and the other principal surface 3b are subjected to a release treatment. The tape-shaped main body 3 is provided with a plurality of housing holes 3c penetrating from the one principal surface 3a to the other principal surface 3b. The plurality of the housing holes 3c is arranged in the longitudinal direction of the tape-shaped main body 3. In an exemplary aspect, the arrangement intervals of the housing holes 3c are equal or substantially equal intervals, for example. The housing holes 3c preferably have a size slightly larger than the electronic components 6 so that the electronic components 6 are entirely housed in a planar view while a gap of about 0.1 mm to about 2 mm, for example, is formed around the electronic components 6. It is noted that the "planar view" as used herein refers to a state viewed in the direction shown in FIG. 1. The tape-shaped main body 3 includes a member having heat resistance and flexibility, for example. The thickness of the tape-shaped main body 3 is about 50 µm to about 800 µm, for example. The thickness of the tape-shaped main body 3, i.e., the depth of the housing holes 3c, is the same or substantially the same as the thickness of the electronic components 6 or thinner than the thickness of the electronic components 6.

The seal materials 4 are affixed to, for example, an antenna base material 11 described later to retain an electrical connection between an antenna element 12 that is an example of a connection object, and the electronic component 6. Each of the seal materials 4 includes an adhesive layer 4a on one principal surface. The adhesive layer 4a is provided on the one entire principal surface of the seal material 4, for example. The seal materials 4 are affixed to the other principal surface 3b of the tape-shaped main body 3 such that the adhesive layers 4a are exposed in the housing holes 3c. In this exemplary embodiment, the seal materials 4 preferably have a size larger than the housing holes 3c so as to completely cover the housing holes 3c. The seal material 4 includes members having heat resistance, flexibility, and elasticity such as polyimide, for example. The thickness of the seal materials 4 is about 20 µm to about 200 µm, for example.

Each of the pairs of the terminal electrodes 5a, 5b electrically connects the electronic component 6 and the antenna element 12 described later and is formed on the adhesive layer 4a of the seal material 4. The pair of the terminal electrodes 5a, 5b has narrow portions formed of a copper foil and therefore can be joined by solder to a pair of input/output terminals of the electronic component 6. Wide portions of the pair of terminal electrodes 5a, 5b are electrically connected to the antenna element 12 by contact or capacitive coupling. As shown in FIG. 3, the one terminal electrode 5a and the other terminal electrode 5b are arranged to face each other with a gap formed therebetween. Therefore, the seal material 4 has an adhesive surface for the antenna element 12 and the antenna base material 11 except the region provided with the terminal electrodes 5a, 5b, and the region provided with the terminal electrodes 5a, 5b has a non-adhesive surface. As shown in FIG. 1, a portion of each of the paired terminal electrodes 5a, 5b is disposed at a position within the housing hole 3c in a planar view. The other portion of each of the paired terminal electrodes 5a, 5b is disposed at a position between the seal material 4 and the tape-shaped main body 3. In this exemplary embodiment, the terminal electrodes 5a, 5b disposed on the seal material 4 function as a wiring pattern for connecting the electronic component 6 and the antenna element 12. In addition to the wiring pattern, the seal material 4 may have a capacitor pattern and an inductor pattern for matching impedance between the electronic component 6 and the antenna element 12.

The electronic components 6 are housed in the housing holes 3c and connected to the pairs of the terminal electrodes 5a, 5b. The electronic components 6 and the pairs of the terminal electrodes 5a, 5b are electrically connected by solder, for example. In this exemplary embodiment, the electronic components 6 are, for example, RFIC chips themselves or RFIC elements (packages or straps with RFIC chips sealed therein), for example. Moreover, in the RFIC elements are preferably ultrathin packages, for example. The height (thickness) of the electronic component 6 is about 50 µm to about 1 mm, for example.

The tape-shaped cover material 7 is affixed to the one principal surface 3a of the tape-shaped main body 3 to cover the plurality of the housing holes 3c housing the electronic components 6. One surface of the tape-shaped cover material 7 has weak adhesiveness so as to facilitate separation even when the electronic components 6 housed in the housing holes 5c are affixed thereto. The tape-shaped cover material 7 has a width shorter than the tape-shaped main body 3 and is affixed to the tape-shaped main body 3 such that the one principal surface 3a of the tape-shaped main body 3 is exposed at both end portions in the width direction. The both end portions in the width direction of the tape-shaped main body 3 is provided with a plurality of feed holes 3d along the longitudinal direction of the tape-shaped main body 3. The tape-shaped cover material 7 is preferably made of a flexible material such as polystyrene, for example. The thickness of the tape-shaped cover material 7 is about 50 µm to about 200 µm, for example.

According to the carrier tape of this exemplary embodiment, since respective portions of the paired terminal electrodes 5a, 5b are located within the housing hole 3c, the electronic component 6 can be housed into the housing hole 3c by using the housing hole 3c as a guide. Therefore, the electronic component 6 can more accurately be positioned and connected to the pair of the terminal electrodes 5a, 5b. Additionally, since the plurality of the electronic components 2 with seal materials is housed in the carrier tape 1, the handleability of the plurality of the electronic components 2 with seal materials is improved.

Although the electronic components 6 preferably are RFIC elements in this exemplary embodiment, it should be appreciated that the present disclosure is in no way so limited. If the electronic components 2 with seal materials are used for a purpose other than manufacturing of RFID tags, the electronic components 6 may be components other than the RFIC elements. For example, the electronic components 6 may be sensor components such as temperature sensors and acceleration sensors. In this case, a plurality of sensor components with seal materials may be housed in a carrier tape, and the carrier tape may be used to affix the sensor components with seal materials to articles that are an example of the connection object such as a carrying case. As a result, the plurality of the sensor components can be mounted on articles at high speed.

A method for manufacturing a carrier tape according to this exemplary embodiment will now be described. Specifically, FIGS. 4A to 9C are views of an example of the method for manufacturing a carrier tape according to an exemplary embodiment.

Figure 4:
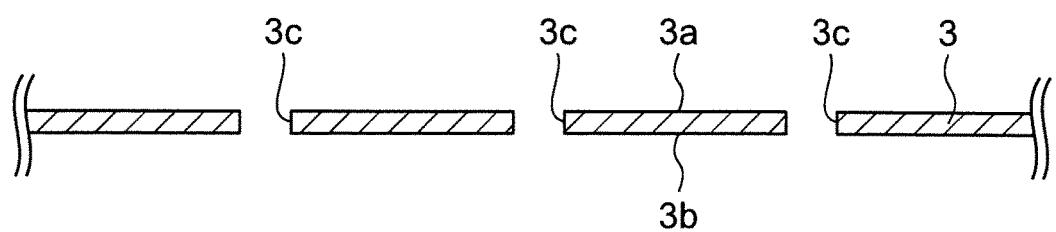
FIG. 4 is a cross-sectional view of an example of a method for manufacturing the carrier tape of FIG. 1.

First, as shown in FIG. 4, the tape-shaped main body 3 is prepared that has a plurality of the housing holes 3c penetrating from the one principal surface 3a to the other principal surface 3b along the longitudinal direction.

Figure 5A:
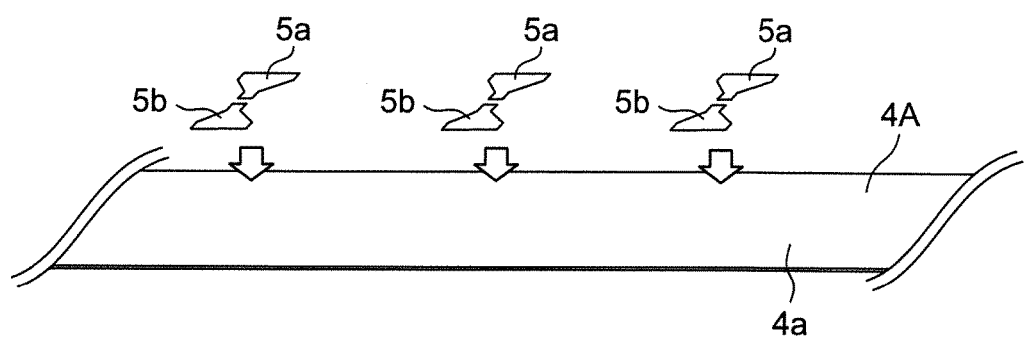
FIG. 5A is a perspective view of a step continued from FIG. 4.
Figure 5B:
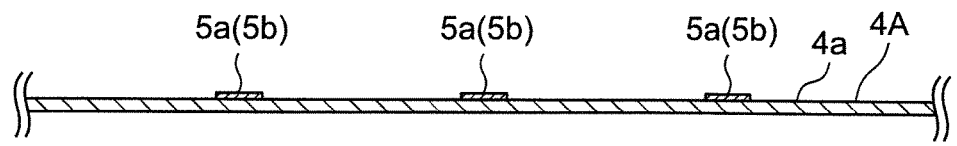
FIG. 5B is a cross-sectional view of a step continued from FIG. 4.

As shown in FIGS. 5A and 5B, a tape-shaped seal material 4A is prepared that has the adhesive layer 4a on one principal surface and that has multiple pairs of the terminal electrodes 5a, 5b on the adhesive layer 4a. The tape-shaped seal material 4A is made of the same material as the seal material 4. The order of preparing the tape-shaped main body 3 and the tape-shaped seal material 4A is not limited.

Figure 6:
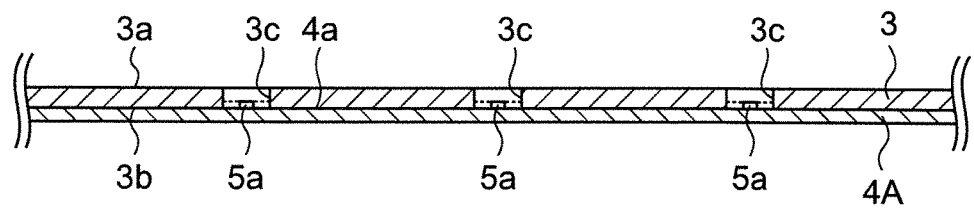
FIG. 6 is a cross-sectional view of a step continued from FIGS. 5A and 5B.

As shown in FIG. 6, the adhesive layer 4a of the tape-shaped seal material 4a is affixed to the other principal surface 3b of the tape-shaped main body 3 such that respective portions of the paired terminal electrodes 5a, 5b are located within each of the housing hole 3c in the planar view.

Figure 7:
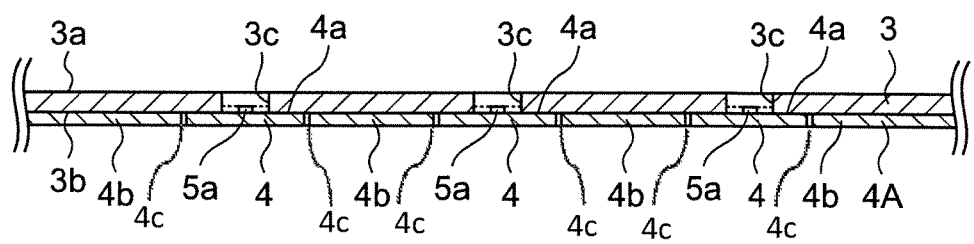
FIG. 7 is a cross-sectional view of a step continued from FIG. 6.

As shown in FIG. 7, cuts 4c are formed in the tape-shaped seal material 4A such that portions defining and functioning as the seal materials 4 including portions overlapping with the housing holes 3c in the planar view are separated from other portions 4b. In this case, the cuts reach the other principal surface 3b of the tape-shaped main body 3.

Figure 8A:
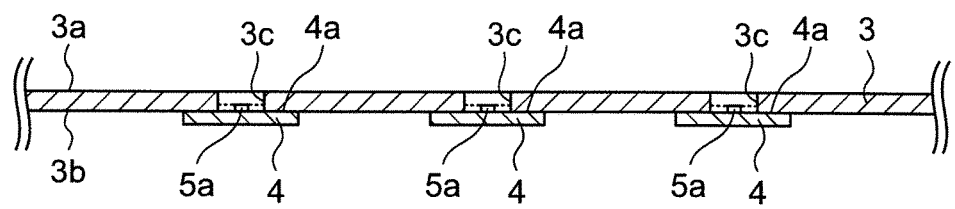
FIG. 8A is a cross-sectional view of a step continued from FIG. 7.
Figure 8B:
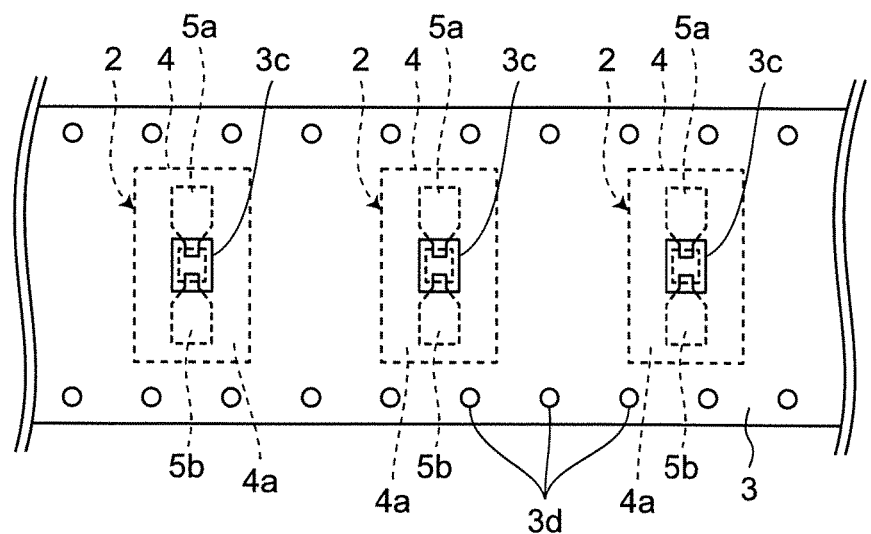
FIG. 8B is a plan view of a step continued from FIG. 7.

As shown in FIGS. 8A and 8B, the other portions 4b are separated from the tape-shaped main body 3. The other portions 4b are connected in the longitudinal direction of the tape-shaped seal material 4A and therefore are able to be sequentially peeled off from the tape-shaped main body 3.

Figure 9A:
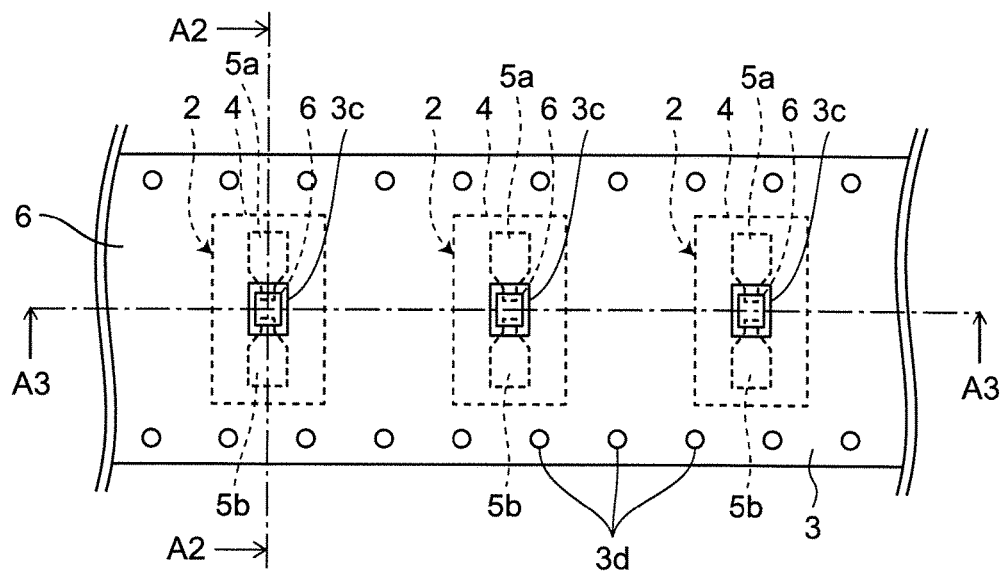
FIG. 9A is a plan view of a step continued from FIGS. 8A and 8B.
Figure 9B:
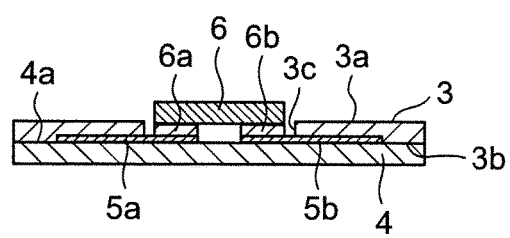
FIG. 9B is a cross-sectional view taken along a line A2-A2 of FIG. 9A.
Figure 9C:
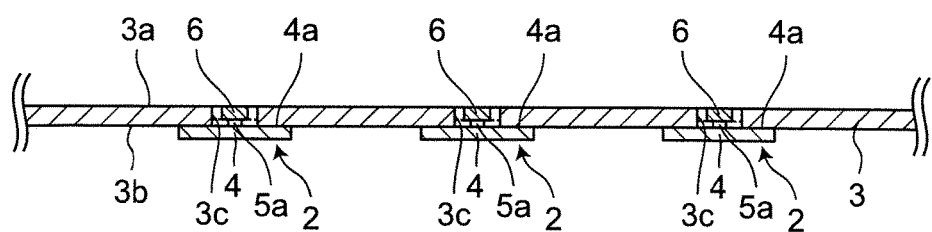
FIG. 9C is a cross-sectional view taken along a line A3-A3 of FIG. 9A.

As shown in FIGS. 9A to 9C, the electronic components 6 are housed in the housing holes 3c of the tape-shaped main body 3, and respective portions of the paired terminal electrodes 5a, 5b located in each of the housing holes 3c are connected to the electronic component 6.

For example, as shown in FIG. 9B, the connection between the pair of the terminal electrodes 5a, 5b and the electronic component 6 can be achieved by heat treatment while solders 6a, 6b are arranged between the pair of the terminal electrodes 5a, 5b and the electronic component 6. In this case, the housing hole 3c can act as a guide to improve the self-alignment effect of the solders 6a, 6b, so that the electronic component 6 can more accurately be connected to the pair of the terminal electrodes 5a, 5b. The solders 6a, 6b may be disposed as precoat on the surface of the electronic component 6, or may be printed on respective portions of the paired terminal electrodes 5a, 5b, before connection.

As shown in FIG. 2, the tape-shaped cover material 7 is affixed to the one principal surface 3a of the tape-shaped main body 3 to cover the plurality of the housing holes 3c housing the electronic components 6. The seal materials 4 and the tape-shaped cover material 6 have flexibility, and the thickness of the electronic components 6 is substantially the same as or greater than the depth of the housing holes 3c. Therefore, the electronic components 6 are sandwiched between the tape-shaped cover material 7 and the pairs of the terminal electrodes 5a, 5b without rattling.

According to the method for manufacturing a carrier tape according to this exemplary embodiment, since respective portions of the paired terminal electrodes 5a, 5b are located within each of the housing holes 3c, the electronic component 6 can be housed into the housing hole 3c by using the housing hole 3c as a guide. Therefore, the electronic component 6 can more accurately be positioned and connected to the pair of the terminal electrodes 5a, 5b.

According to the method for manufacturing a carrier tape according to this exemplary embodiment, since the plurality of the electronic components 2 with seal materials is housed in the carrier tape 1, the handleability of the plurality of the electronic components 2 with seal materials is improved.

According to the method for manufacturing a carrier tape according to this exemplary embodiment, the tape-shaped cover material 7 is affixed to the one principal surface 3a of the tape-shaped main body 3. Therefore, dusts, or the like, are prevented from entering the housing holes 3c housing the electronic components 6, and the electronic component 6 can more accurately be connected to the pair of the terminal electrodes 5a, 5b.

According to the method for manufacturing a carrier tape according to this exemplary embodiment, the cuts 4c are formed in the tape-shaped seal material 4A before separating the portions 4b other than those defining and functioning as the seal materials 4 from the tape-shaped main body 3. As a result, when the electronic components 2 with seal materials are separated from the tape-shaped main body 3, the electronic components 2 with seal material are separated after the portions 4b other than those defining and functioning as the seal materials 4 are removed, and therefore are able to be easily removed.

Although the tape-shaped cover material 7 is affixed to the one principal surface 3a of the tape-shaped main body 3 in the first exemplary embodiment, it should be appreciated that this feature is not so required. For example, if the tape-shaped main body 3 having the plurality of the electronic components 2 with seal materials attached thereto (in the state shown in FIG. 9C) is wound around a reel, the other principal surface 3b of the tape-shaped main body 3 abutting on the inside fulfills the function of the tape-shaped cover material 7. Such a case eliminates the need for the tape-shaped cover material 7. In the case of winding the tape-shaped main body 3 around a reel, if the electronic components 6 are made thicker than the tape-shaped main body 3, the electronic components 6 are pushed against the pairs of the terminal electrodes 5a, 5b, so that the electronic components 6 and the pairs of the terminal electrodes 5a, 5b are more reliably connected.

Although after the cuts 4c are formed in the tape-shaped seal material 4A, the portions 4b other than those defining and functioning as the seal materials 4 are separated from the tape-shaped main body 3 in this exemplary embodiment, it should be appreciated that the exemplary embodiment is not so limited. The adhesion between the other portions 4b and the tape-shaped main body 3, the size of the cuts 4c, and the like, may be adjusted such that when the electronic components 2 with seal materials are separated from the tape-shaped main body 3, the separation is not prevented by the portions 4b other than those defining and functioning as the seal materials 4. This eliminates the need to separate the other portions 4b from the tape-shaped main body 3.

Figure 10:
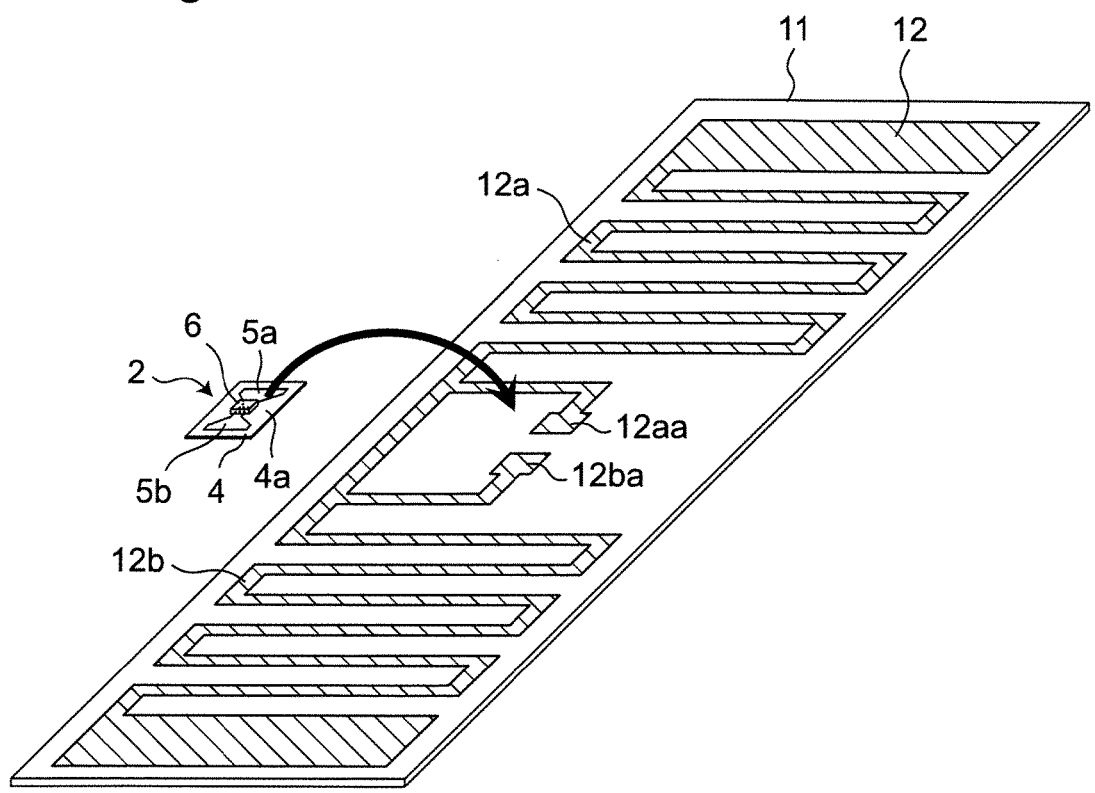
FIG. 10 is a perspective view of a method for manufacturing an RFID tag.
Figure 11A:
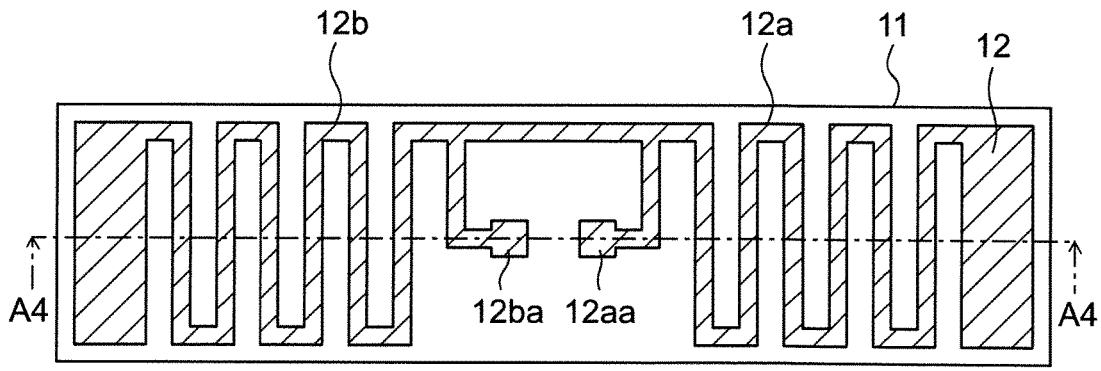
FIG. 11A is a plan view of an antenna element and an antenna base material.
Figure 11B:
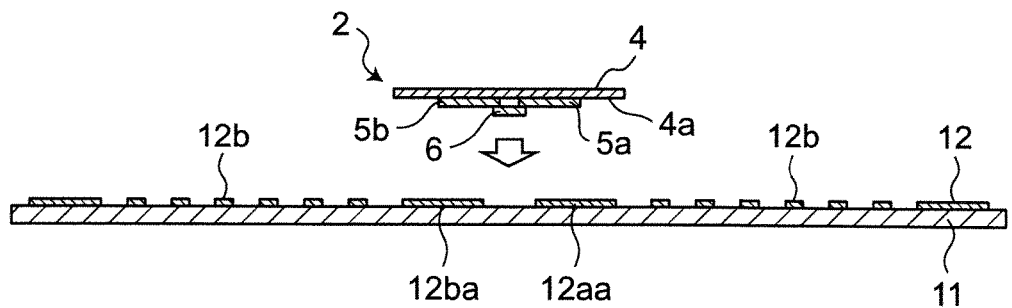
FIG. 11B is a cross-sectional view taken along a line A4-A4 of FIG. 11A.
Figure 12A:
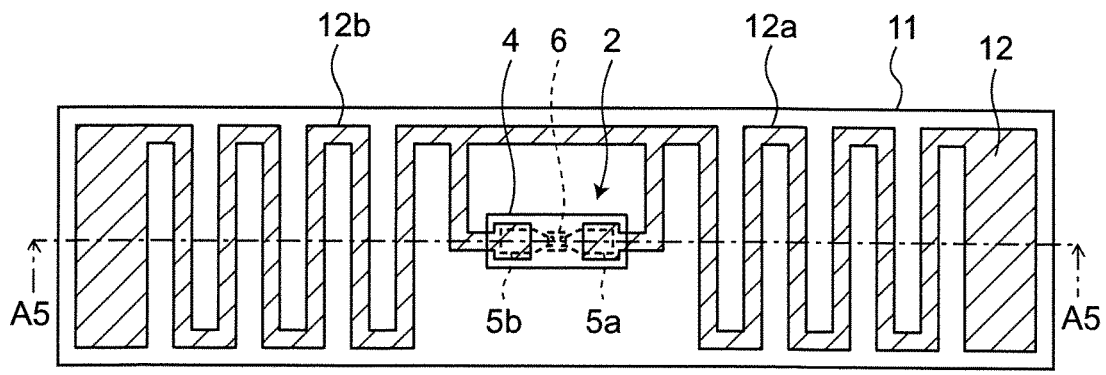
FIG. 12A is a plan view of a state in which the electronic component with a seal material is attached onto the antenna element.
Figure 12B:
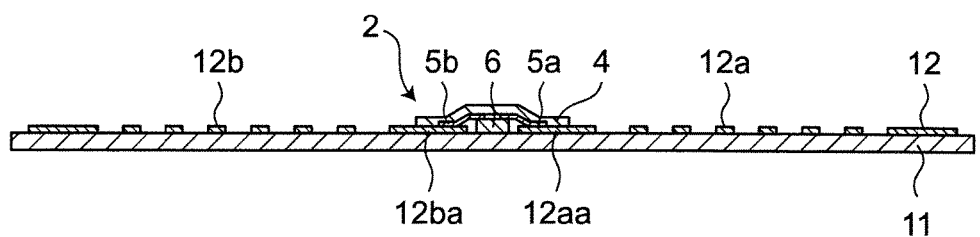
FIG. 12B is a cross-sectional view taken along a line A5-A5 of FIG. 12A.

A method for manufacturing an RFID tag 10 by using an electronic component with a seal material, i.e., an RFIC element 2 with a seal material, will be described. FIG. 10 is a perspective view of the method for manufacturing the RFID tag 10. FIG. 11A is a plan view of the antenna base material 11 and the antenna element 12 that are components of the RFID tag 10. FIG. 11B is a cross-sectional view taken along a line A4-A4 of FIG. 11A. FIG. 12A is a plan view of a state in which the electronic component 2 with a seal material is attached onto the antenna element 12. FIG. 12B is a cross-sectional view taken along a line A5-A5 of FIG. 12A.

As shown in FIGS. 10 to 12B, the RFID tag 10 is manufactured by attaching the electronic component 2 with a seal material to the antenna element 12 on one principal surface of the antenna base material 11. In one exemplary aspect, the RFID tag 10 is, for example, an RFID tag using the 900 MHz band as a communication frequency.

The antenna base material 11 preferably includes a flexible material such as polyethylene terephthalate (PET) and paper. One principal surface is provided with the antenna element 12 made of coper foil or aluminum foil or silver paste.

The antenna element 12 preferably is formed into a meandering shape, for example, and includes antenna conductors 12a, 12b defining and functioning as a dipole antenna. A first end portion 12aa and a second end portion 12ba are an end portion of the antenna conductor 12a and an end portion of the antenna conductor 12b, respectively, and are spaced away from each other. An interval between the first end portion 12aa and the second end portion 12ba is identical or substantially identical to an interval between the paired terminal electrodes 5a, 5b.

The seal material 4 of the electronic component 2 with a seal material is affixed by the adhesive layer 4a to the antenna base material 11 such that the first end portion 12aa and the second end portion 12ba are brought into contact with the one terminal electrode 5a and the other terminal electrode 5b, respectively. As a result, as shown in FIGS. 12A and 12B, the RFID tag 10 is completed. In this case, the first end portion 12aa and the one terminal electrode 5a as well as the second end portion 12ba and the other terminal electrode 5b are in direct contact with each other without an adhesive such as the adhesive layer 4a interposed therebetween.

The first end portion 12aa and the one terminal electrode 5a as well as the second end portion 12ba and the other terminal electrode 5b may not directly be fixed to each other. In this case, even when the antenna base material 11 is bent, the first end portion 12aa and the one terminal electrode 5a as well as the second end portion 12ba and the other terminal electrode 5b slide at respective connection portions and, therefore, no stress concentrates on the connection portions. Therefore, degradation in reliability of the connection is able to be suppressed between the electronic component 2 with a seal material and the antenna element 12.

Figure 13:
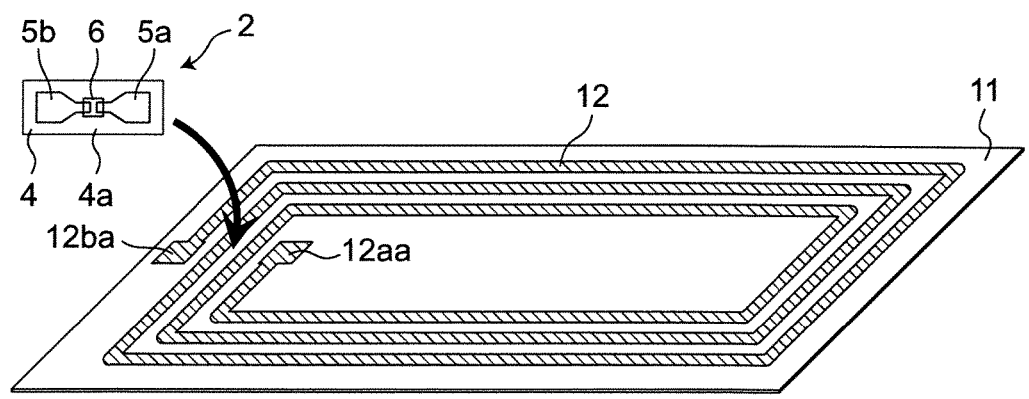
FIG. 13 is a perspective view of a modification example of the method for manufacturing an RFID tag.

Although the antenna conductors 12a, 12b preferably have a meandering shape in this exemplary embodiment, it should be appreciated that the antenna conductors 12a, 12b should in no way be so limited. Moreover, the antenna conductors 12a, 12b may be formed into, for example, a rectangular or substantially rectangular belt shape or other shapes. Although the antenna conductors 12a, 12b define and function as a dipole antenna, it should be appreciate that the antenna conductors 12a, 12b are not so limited. The antenna conductors 12a, 12b may define and function as a loop type antenna or may act as other types of antenna. As shown in FIG. 13, the antenna element 12 may function as a spiral antenna. In this case, for example, the antenna element 12 may be covered with a resist film except the first end portion 12aa and the second end portion 12ba, and the first end portion 12aa and the second end portion 12ba may be connected to the one terminal electrode 5a and the other terminal electrode 5b, respectively. As a result, an HF band RFID tag using the HF band as the communication frequency band can be configured.

Figure 14:
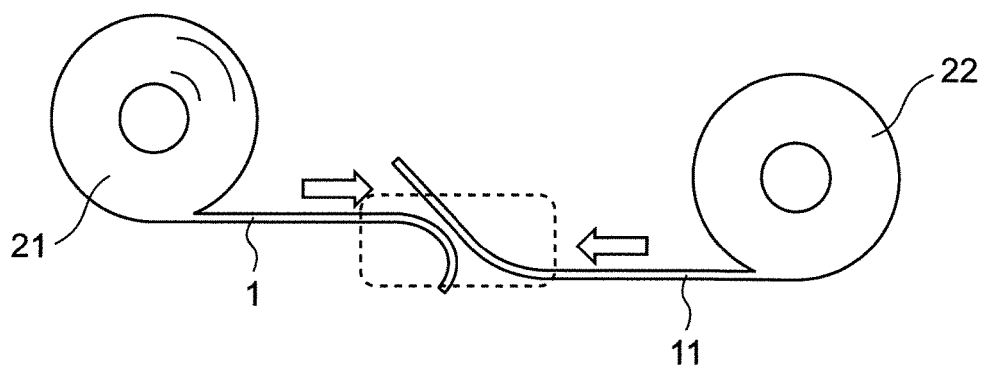
FIG. 14 is a side view of an example of a method for manufacturing a plurality of RFID tags by using the carrier tape of FIG. 1.
Figure 15:
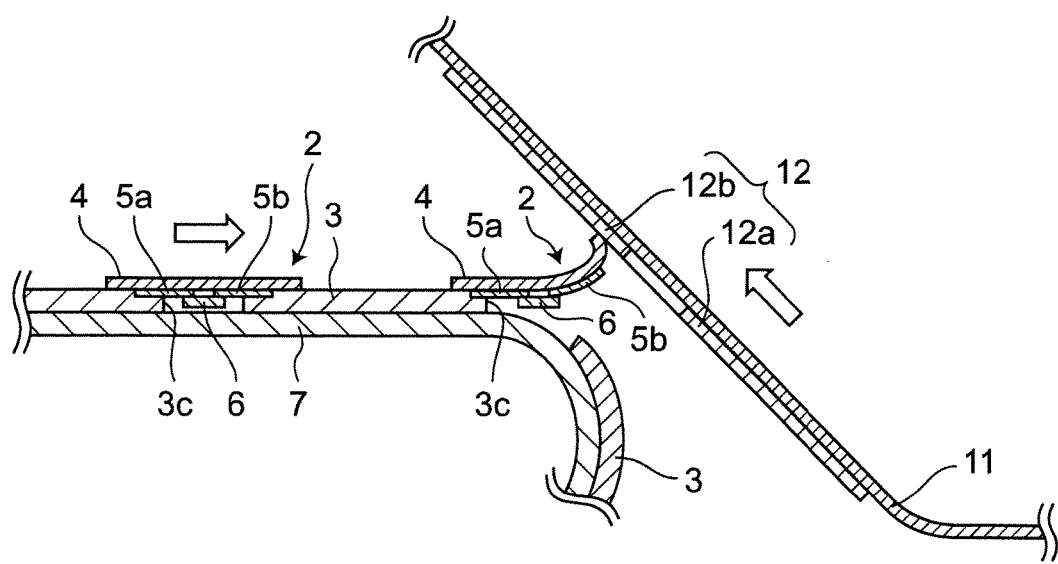
FIG. 15 is an enlarged cross-sectional view of a portion surrounded by a dotted line of FIG. 14.

A method for manufacturing a plurality of the RFID tags 10 by using the carrier tape 1 will be described. FIG. 14 is a side view of an example of the method for manufacturing a plurality of the RFID tags 10 by using the carrier tape 1. FIG. 15 is an enlarged cross-sectional view of a portion surrounded by a dotted line of FIG. 14.

First, as shown in FIG. 14, a supply reel 21 is prepared with the carrier tape 1 wound there around. The plurality of the antenna base materials 11 including the antenna elements 12 provided thereon as shown in FIG. 11 is connected in series and formed into a tape shape to prepare the supply reel 22 with the plurality of the antenna base materials 11 wound there around.

In an exemplary aspect, the carrier tape 1 is continuously pulled out from the supply reel 21 while pulling out the antenna base materials 11 including the antenna elements 12 thereon from the supply reel 22, and the carrier tape 1 and the antenna base materials 11 are brought closer to each other.

As shown in FIG. 15, the tape-shaped main body 3 of the carrier tape 1 is folded (bent) in the vicinity of the antenna base materials 11 to separate the RFIC element 2 with a seal material from the tape-shaped main body 3. At the time of separation, while the RFIC element 2 with a seal material is being separated from the tape-shaped main body 3, the RFIC element 2 with a seal material is affixed to the antenna element 12 transported in the direction intersecting with the transport direction of the carrier tape 1.

More specifically, by folding the tape-shaped main body 3 of the carrier tape 1 in the vicinity of the antenna base materials 11, one end portion of the seal material 4 first peels off from the tape-shaped main body 3. The one end portion of the seal material 4 adheres to the antenna base material 11 by the adhesive force of the adhesive layer 4a such that the other terminal electrode 5b comes into contact with the antenna conductor 12b of the antenna element 12 transported in the direction intersecting with the transport direction of the carrier tape 1. Subsequently, as the carrier tape 1 and the antenna element 12 further move, the other end portion of the seal material 4 peels off from the tape-shaped main body 3. The other end portion of the seal material 4 adheres to the antenna base material 11 by the adhesive force of the adhesive layer 4a such that the one terminal electrode 5a comes into contact with the antenna conductor 12a of the antenna element 12 transported in the direction intersecting with the transport direction of the carrier tape 1. As a result, the RFID tag 10 shown in FIGS. 12A and 12B is manufactured. By sequentially performing this operation, a plurality of RFID tags 10 are able to be manufactured.

According to the method for manufacturing an RFID tag according to this exemplary embodiment, since respective portions of the paired terminal electrodes 5a, 5b are located within each of the housing holes 3c, the RFIC element 6 can be housed into the housing hole 3c by using the housing hole 3c as a guide. Therefore, the RFIC element 6 can more accurately be positioned and connected to the pair of the terminal electrodes 5a, 5b. Since an adhesive is not applied onto the pair of the terminal electrodes 5a, 5b, and the pair of the terminal electrodes 5a, 5b is on the adhesive layer 4a, the adhesive layer 4a is not formed on the pair of the terminal electrodes 5a, 5b. On the other hand, the adhesive layer 4a is formed on the portion other than the pair of the terminal electrodes 5a, 5b. Therefore, it is not necessary to accuracy apply the adhesive layer 4a, and an amount of the adhesive does not become insufficient, so that the reliability of the connection between the antenna element 12 and the pair of the terminal electrodes 5a, 5b can be improved.

According to the method for manufacturing an RFID tag according to this exemplary embodiment, since the RFIC elements 2 with seal materials are able to be separated from the tape-shaped main body 3 by simply folding the tape-shaped main body 3, manufacturing steps are shortened and manufacturing costs are reduced. An angle of the fold of the tape-shaped main body 3 and a degree of curvature at the folded position may appropriately be set in consideration of the adhesive force between the RFIC elements 2 with seal materials and the tape-shaped main body 3 etc.

According to the exemplary method for manufacturing an RFID tag as disclosed herein, since the plurality of the RFIC elements 2 with seal materials is housed in the carrier tape 1 and, therefore, the handleability of the plurality of the RFIC elements 2 with seal materials is improved.

According to the exemplary method for manufacturing an RFID tag, while the carrier tape 1 is continuously pulled out from the supply reel 21, the tape-shaped main body 3 of the pulled-out carrier tape 1 is folded at a certain position away from the supply reel 21. As a result, the plurality of the RFIC elements 2 with seal materials is sequentially separated from the tape-shaped main body 3 and sequentially affixed to the antenna base material 11 pulled out from the supply reel 22. Therefore, for example, the carrier tape 1 can be pulled out at a rate of several dozen m per minute to separate the plurality of the RFIC elements from the tape-shaped main body 3 at high speed. Consequently, a plurality of the RFID tags 10 are able to be manufactured in shorter time.

Preferably, the seal materials 4 have a rectangular or substantially rectangular shape and, when the RFIC elements 2 with seal materials are each separated from the tape-shaped main body 3, a portion in the longitudinal direction of the seal material 4 is first separated. As a result, the RFIC elements 2 with seal materials are able to be more easily separated from the tape-shaped main body 3.

The seal materials 4 preferably have rigidity higher than the tape-shaped main body 3. As a result, when the tape-shaped main body 3 is folded, the separation of the seal materials 4 from the tape-shaped main body 3 is facilitated. Therefore, the seal materials 4 are preferably made of a material having quality or property associated with a larger elastic force (resilience), such as a larger Young's modulus and a greater thickness, than the tape-shaped main body 3.

The carrier tape 1 after the separation of the RFIC elements 2 with seal materials may be wound around a winding reel (not shown). In particular, the carrier tape 1 may be transported by a roll-to-roll technique. Similarly, the antenna base materials 11 including the antenna elements 12 thereon may be transported by a roll-to-roll technique.

In the example of manufacturing shown in FIGS. 14 and 15, the RFIC elements 2 with seal materials (i.e., the plurality of seals) separated from the tape-shaped main body 3 are directly affixed to the antenna base material 11 in one exemplary aspect. For example, as shown in FIGS. 16 and 17, the RFIC elements 2 with seal materials separated from the tape-shaped main body 3 may be affixed to the antenna base material 11 by using a conveyer 23.

More specifically, the carrier tape 1 pulled out from the supply reel 21 is folded at a certain position away from the supply reel 21 to separate the RFIC element 2 with a seal material from the tape-shaped main body 3. The separated RFIC element 2 with a seal material is conveyed by the conveyer 23 to the vicinity of the antenna base material 11 pulled out from the supply reel 22. As a result, one end portion of the seal material 4 adheres to the antenna base material 11 by the adhesive force of the adhesive layer 4a such that the other terminal electrode 5b comes into contact with the antenna conductor 12b of the antenna element 12. The other end portion of the seal material 4 adheres to the antenna base material 11 by the adhesive force of the adhesive layer 4a such that the one terminal electrode 5a comes into contact with the antenna conductor 12a of the antenna element 12. By sequentially performing this operation, a plurality of RFID tags 10 are able to be manufactured.

According to this configuration, the adjustment of machinery is made easier and the RFIC elements 2 with seal materials are able to be more accurately affixed to the antenna base material 11 such that the pair of terminal electrodes 5a, 5b come into contact with the first end portion 12aa and the second end portion 12ba.

Figure 16:
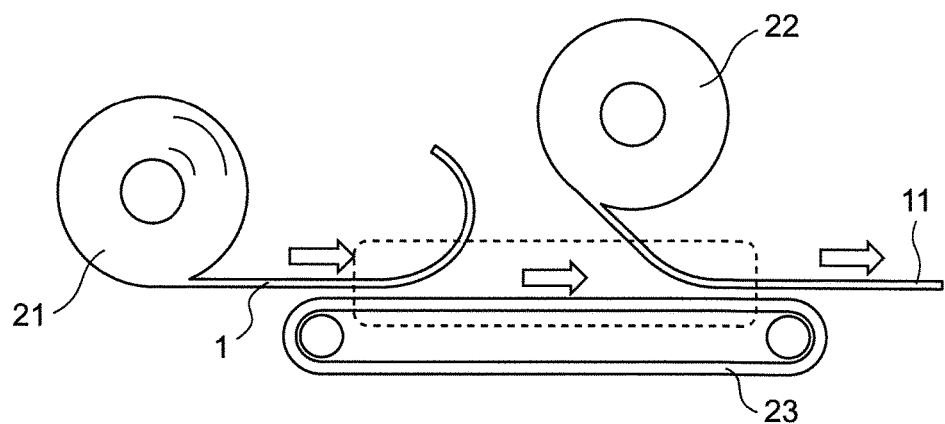
FIG. 16 is a side view of another example of the method for manufacturing a plurality of RFID tags by using the carrier tape of FIG. 1.
Figure 17:
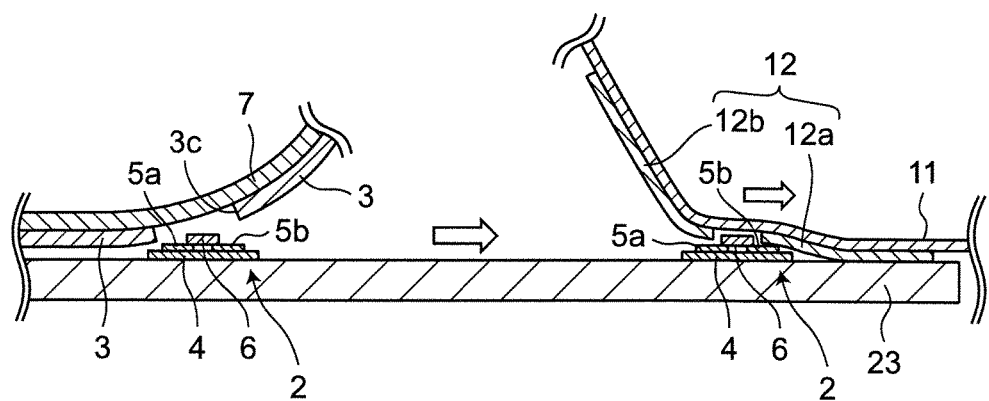
FIG. 17 is an enlarged cross-sectional view of a portion surrounded by a dotted line of FIG. 16.

The conveyer 23 may be an apparatus such as a suction head instead of a belt-conveyor-type apparatus as shown in FIGS. 16 and 17. In particular, the RFIC element 2 with a seal material separated from the tape-shaped main body 3 may be sucked by a suction head and affixed to the antenna base material 11 such that the pair of terminal electrodes 5a, 5b come into contact with the first end portion 12aa and the second end portion 12ba.

Although the exemplary embodiments of the present disclosure have been sufficiently described in terms of preferred embodiments with reference to the accompanying drawings, various modifications and corrections are apparent to those skilled in the art. It should be understood that such modifications and corrections are included in the present invention without departing from the scope of the present invention according to the accompanying claims.

Since electronic components can more accurately be connected to pairs of terminal electrodes, preferred embodiments of the present invention are useful for manufacturing of RFID tags, a carrier tape used in the manufacturing, and a method for manufacturing the same.

What is claimed:

1. A method for manufacturing a carrier tape housing a plurality of electronic components, the method comprising:
    preparing a tape-shaped main body having a plurality of housing holes extending from a first principal surface to a second principal surface that opposes the first principal surface;
    preparing a tape-shaped seal material having an adhesive layer disposed thereon and a plurality of pairs of terminal electrodes thereon;
    affixing the adhesive layer of the tape-shaped seal material to the second principal surface of the tape-shaped main body such that respective portions of the paired terminal electrodes face each other in a transverse direction of the tape-shaped main body and are located within the housing holes, respectively, in a planar view of the tape-shaped main body;
    separating portions of the tape-shaped main body to define a plurality of seals that overlap the housing holes, respectively, in the planar view of the tape-shaped main body; and
    providing a plurality of chip-shaped electronic components into each of the housing holes of the tape-shaped main body, respectively.

2. The method for manufacturing a carrier tape according to claim 1, further comprising connecting the respective portions of the paired terminal electrodes located within each of the housing holes to the respective electronic component.

3. The method for manufacturing a carrier tape according to claim 1, wherein the separating of portions of the tape-shaped main body to define the plurality of seals comprises forming cuts in the tape-shaped seal material to separate portions thereof to define the respective seals.

4. The method for manufacturing a carrier tape according to claim 1, further comprising affixing a tape-shaped cover material to the first principal surface of the tape-shaped main body to cover the plurality of the housing holes housing the respective electronic components.

5. The method for manufacturing a carrier tape according to claim 1, further comprising removing the portions of the tape-shaped main body other than the portions defining the respective seals materials from the tape-shaped main body.

6. The method for manufacturing a carrier tape according to claim 1, further comprising guiding, using each housing hole with the respective paired terminal electrode disposed therein, the chip-shaped electronic component into the respective housing hole.

7. The method for manufacturing a carrier tape according to claim 1, wherein the plurality of seals each have a rigidity that is higher than a rigidity of the tape-shaped main body.

8. The method for manufacturing a carrier tape according to claim 1, wherein the electronic components are RFIC elements.

9. A carrier tape housing a plurality of electronic components, the carrier tape comprising:
- a tape-shaped main body having a plurality of housing holes extending from a first principal surface to a second principal surface that opposes the first principal surface;
- a plurality of seals each having an adhesive layer on a principal surface thereof;
- a plurality of pairs of terminal electrodes affixed to the second principal surface of the tape-shaped main body, such that respective portions of the paired terminal electrodes face each other in a transverse direction of the tape-shaped main body and are located within each of the housing holes, respectively, in a planar view of the tape-shaped main body; and
- a plurality of chip-shaped electronic components housed in the respective housing holes and connected to the respective portions of the paired terminal electrodes located within the housing holes, respectively.

10. The carrier tape according to claim 9, wherein the plurality of seals each have a rigidity that is higher than a rigidity of the tape-shaped main body.

11. The carrier tape according to claim 9, wherein the electronic components are RFIC elements.

12. The carrier tape according to claim 9, wherein each of the plurality of seals completely covers the respective housing hole of the tape-shaped main body to seal the respective chip-shaped electronic component therein.

13. The carrier tape according to claim 9, wherein each respective housing hole has a width in the planar direction of the tape-shaped main body that is larger than a width of the respective chip-shaped electronic component disposed therein.

14. The carrier tape according to claim 13, wherein each respective housing hole has a depth in a thickness direction of the tape-shaped main body that is equal to a thickness of the respective chip-shaped electronic component disposed therein.

15. The carrier tape according to claim 9, wherein each of the paired terminal electrodes comprises a narrow portion configured to connect to the respective chip-shaped electronic component and a wide portion configured to electrically connect to an antenna component.

16. A method for manufacturing an RFID tag, comprising:
preparing a carrier tape housing a plurality of RFIC elements, the carrier tape having:
- a tape-shaped main body including a plurality of housing holes extending from a first principal surface to a second principal surface opposing the first principal surface,
- a plurality of seals each having an adhesive layer on a principal surface thereof,
- a plurality of pairs of terminal electrodes affixed to the second principal surface of the tape-shaped main body, such that respective portions of the paired terminal electrodes face each other in a transverse direction of the tape-shaped main body and are located within each of the housing holes, respectively, in a planar view of the tape-shaped main body, and
- a plurality of RFIC elements housed in the respective housing holes and connected to the respective portions of the paired terminal electrodes located within the housing holes, respectively;

folding the tape-shaped main body to separate each of the RFIC elements with the respective seals from the tape-shaped main body; and affixing each separated RFIC element with a respective seal to an antenna base material by the adhesive layer of the respective seals.

17. The method for manufacturing an RFID tag according to claim 16, wherein the carrier tape is wound around a supply reel, and
wherein the method further comprises folding, while the carrier tape is continuously pulled out from the supply reel, the tape-shaped main body of the pulled-out carrier tape at a respective positions away from the supply reel to sequentially separate the plurality of the RFIC elements with respective seals from the tape-shaped main body.

18. The method for manufacturing an RFID tag according to claim 16, wherein the plurality of seals have a longitudinal direction and a transverse direction in a planar view thereof, and
wherein the method further comprises first separating, when each of the RFIC elements with a respective seal is separated from the tape-shaped main body, a portion in the longitudinal direction of the seal material.

19. The method for manufacturing an RFID tag according to claim 16, further comprising guiding, using each housing hole with the respective paired terminal electrodes disposed therein, the RFIC element into the respective housing hole.

20. The method for manufacturing an RFID tag according to claim 16, wherein the plurality of seals each have a rigidity higher than a rigidity of the tape-shaped main body.

* * * * *